(No Model.) 3 Sheets—Sheet 1.

J. W. HYATT.
FILTER.

No. 338,414. Patented Mar. 23, 1886.

WITNESSES:
Wm. P. Gill,
George Cook

INVENTOR
John W. Hyatt (No Model.) 3 Sheets—Sheet 2.

J. W. HYATT.
FILTER.

No. 338,414. Patented Mar. 23, 1886.

WITNESSES:
Wm. P. Gill
George Cook

INVENTOR
John W. Hyatt

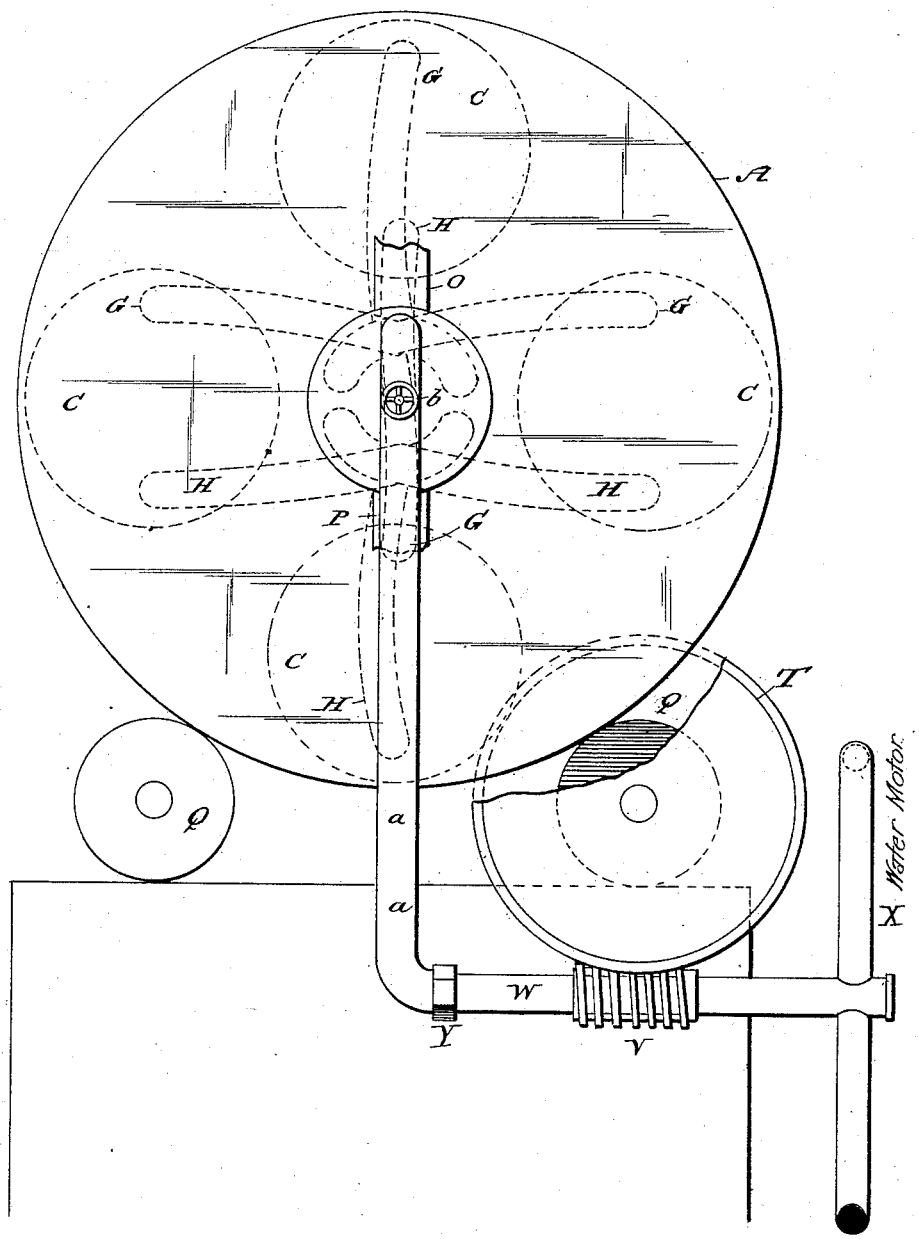

UNITED STATES PATENT OFFICE.

JOHN W. HYATT, OF NEWARK, NEW JERSEY.

FILTER.

SPECIFICATION forming part of Letters Patent No. 338,414, dated March 23, 1886.

Application filed July 17, 1885. Serial No. 171,839. (No model.)

*To all whom it may concern:*

Be it known that I, JOHN W. HYATT, a citizen of the United States, residing at Newark, in the county of Essex and State of New Jersey, have invented certain new and useful Improvements in Filters, of which the following is a specification.

The invention relates to improvements in filters; and it consists in certain novel apparatus hereinafter described, whereby large volumes of water may be rapidly and effectually cleansed, and wherein the beds of filtering material may without checking the flow of water be agitated at will, loosening and removing arrested silt and other impurities.

The nature of the invention will be understood from the detailed description hereinafter presented, reference being had to the accompanying drawings, in which—

Figure 1:
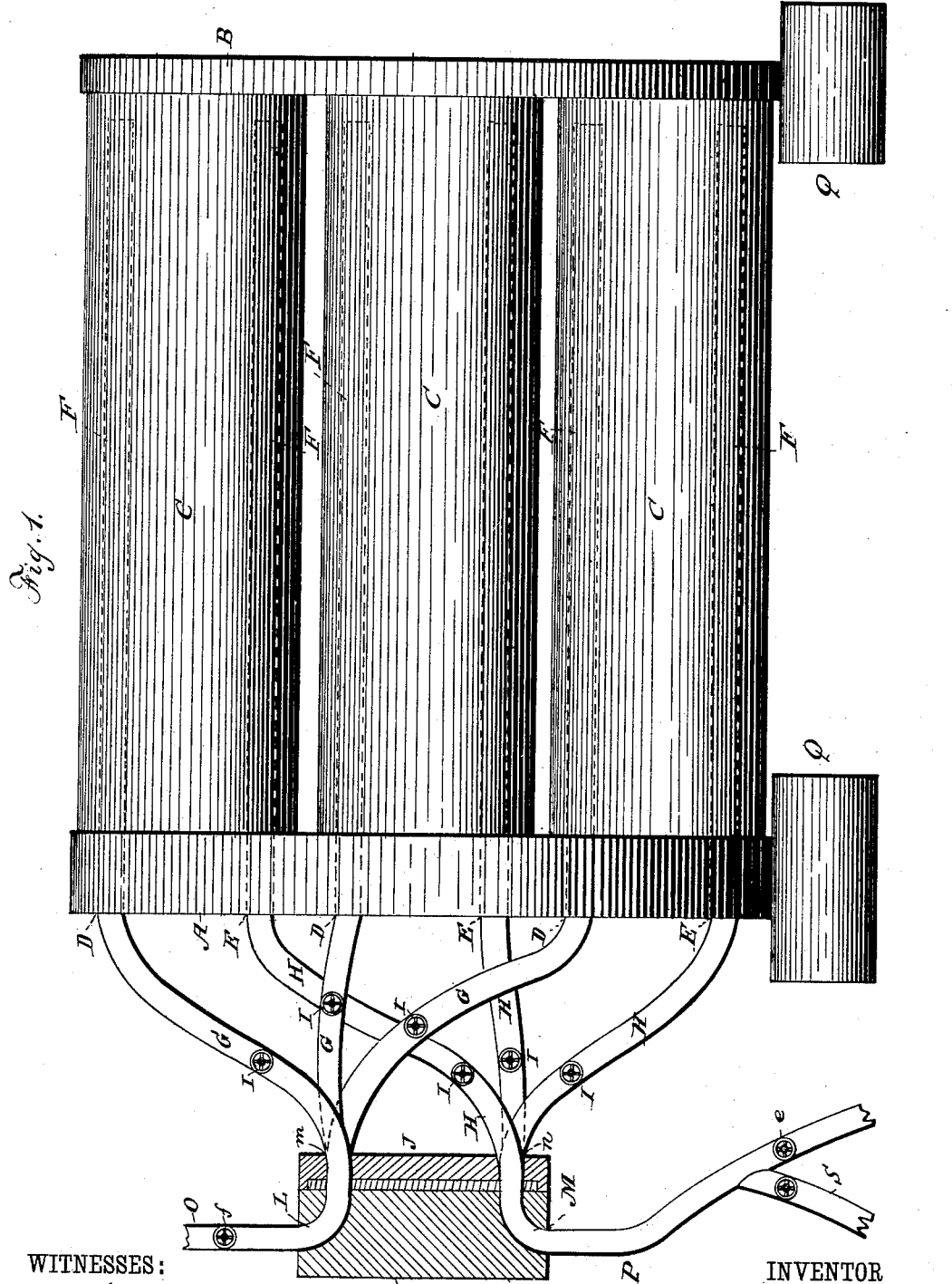
Figure 2:
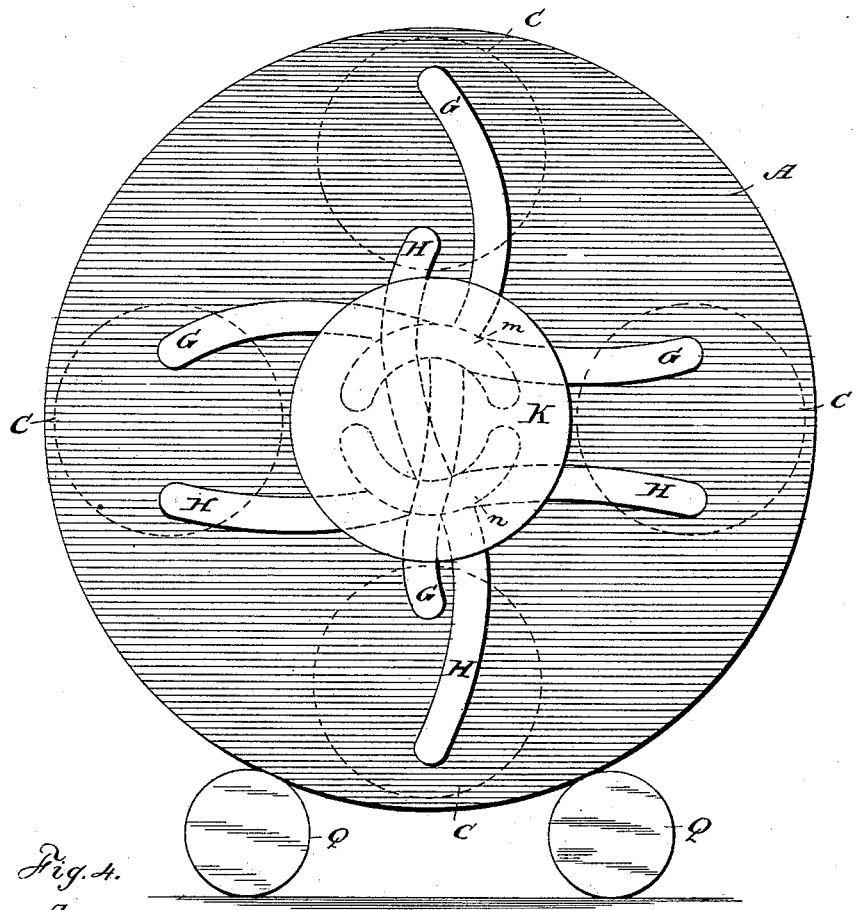
Figure 4:
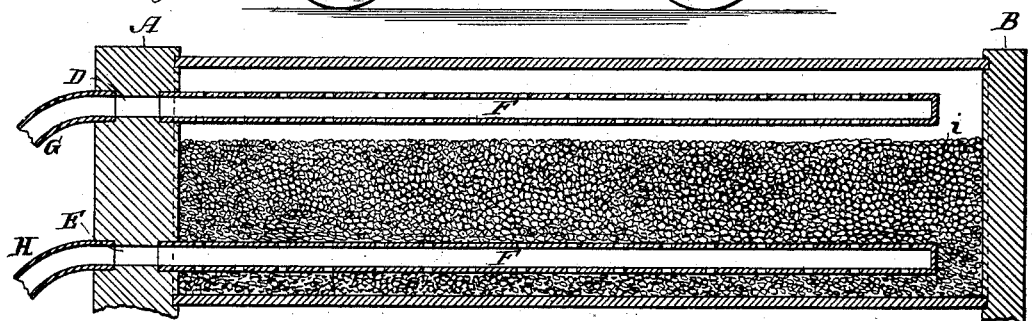

Figure 1 is a side elevation, partly in section, of an apparatus incorporating the elements of the invention. Fig. 2 is a front end view of same. Fig. 3 is a front end view of a slightly modified form of apparatus embodying the invention; and Fig. 4 is a sectional view of one of the cylinders.

In connection with the present application I direct attention to Letters Patent of the United States numbered 273,543, issued to me March 6, 1883, for improvements in filters, in which patent I describe and claim a part of the apparatus sought to be protected hereby, as hereinafter specified.

In the accompanying drawings, A B, respectively, designate two heads, between which are secured any suitable number of cylindrical receptacles, C, each having an inlet-port, D, an outlet-port, E, and perforated tubes F, passing inward from said ports almost the entire length of the cylinders.

From the inlet and outlet ports, lettered D E, respectively, of all the cylinders C, extend the supply-pipes G and delivery-pipes H, provided with suitable valves, I, and connecting at their outer ends with common supply and delivery ports, *m n*, in the rotating disk J, as indicated in Fig. 1. The disk J is arranged in contact with a stationary disk, K, in the upper portion of which is formed a passage, L, connecting with the supply-port *m*, and in the lower portion whereof is provided a similar passage, M, connecting with the delivery-port *n* in the disk J. A main supply-pipe, O, for the water to be filtered enters the passage L, and from the passage M the purified water is led by a delivery-pipe, P, which will be provided with a valve, *e*, similar to the valve *f* in the supply-pipe O. The outer portions of the passages L M in the disk K will, preferably, conform to the bore of the supply and delivery pipes, while the inner portion of said passages will be elongated, as indicated by dotted lines in Fig. 3, so that upon the rotation of the disk J the ports *m n* therein will remain in connection with the said passages during their entire movement, whereby the flow of water and operation of the filter will remain practically unchecked while the position of the cylinders C is being reversed.

Within each of the cylinders C is placed a suitable quantity of sand or other desirable filtering agent, to form a bed, *i*, say, about two-thirds filling the cylinder, substantially as specified in my Letters Patent aforesaid.

The heads A B will be mounted in any manner which will permit of their being rotated with the cylinders C. In the present instance the heads are set upon rollers Q, and a means of effectuating their rotation upon the same are shown in Fig. 3, and will be described hereinafter.

In the operation of filtering, in connection with the apparatus illustrated in Fig. 1, the water will flow from the supply-pipe O through the passage L and port *m* into the various supplemental supply-pipes G, and thence into the upper tubes F, from the perforations in which it will escape, passing downward through the beds of filtering material *i* into the lower perforated tubes F, and being delivered through the series of pipes H, port *n*, and passage M into the pipe P, which leads it into the service-pipes of the house or city in a purified condition, the silt and other foreign matter having been arrested during the passage of the water through the filter-beds. It should be noted that the main volume of water in the supply-pipe O is divided into smaller streams, which, after being separately purified, meet for purposes of delivery, and that thereby I am enabled to construct a filter of large capacity without using a filter-bed of such proportions as will prevent its being conveniently handled, agitated, or cleansed. After the beds of filtering agent have become fouled by impurities arrested from the water it will be necessary to thoroughly agitate them for the purpose of loosening the impurities, and to reverse the current of water, so as to carry off the foreign matter, and to accomplish this result in the apparatus which is the subject of this application it is simply necessary to give the heads A B a single revolution, which has the effect of directly reversing the position of the cylinders C, pipes G H, and disk J, and of causing the beds of filtering agent to change their position in the cylinders C, whereby they are thoroughly agitated and the passage of the water through them is facilitated. After the position of the cylinders C and disk J has been reversed, as aforesaid, the flow of water continues as before; but at this time the water from the supply-pipe O will pass through the port $n$ in the disk J, the pipes H, and perforated tubes F, which are now uppermost, although they before afforded a means of escape for the water. It will thus be seen that the flow of water has not altered its direction, but that the revolving parts of the apparatus have assumed an inverted position, and that the water is thus caused to enter the disk, pipes, and cylinders at points where it before escaped, and to find an exit therefrom through the former passages of entry. The water passing through the apparatus immediately after its position has been reversed will be more or less impure, and for this reason I divert it for a few minutes into a waste-pipe, S, by opening the valve therein and closing the valve in the regular delivery-pipe P.

The number of cylinders C to be used and their size will be determined by the volume of water to be filtered and the depth of filter-bed required. I first determine the proper depth of filter-bed that is required to secure the best results, and then multiply these beds in cylinders C about two-thirds filled by them until an apparatus of the desired capacity has been constructed. By this means I am enabled to construct an apparatus of large capacity, and at the same time always maintain the proper depth of bed to secure the best results.

If preferred, in lieu of using the pipes G H, the disk K may be placed close against or into a seat formed in the head A, and the said head suitably provided with channels leading from the supply and delivery ports in the disk K to the perforated pipes F in the cylinders C. This would simplify the construction of the apparatus in some respects, and be more desirable for use under certain circumstances. In Fig. 3 I have illustrated such a construction of the apparatus, the channels in the head A being shown in dotted lines and lettered G H, respectively, the same as the pipes in Fig. 1, for which they are intended to be used as substitute.

Various means may be adopted for rotating the apparatus described in order to reverse the position of the filter-beds; but I have shown one in Fig. 3 which may be used with satisfactory results, and which will entail the least amount of attention. In said figure the apparatus, as in Fig. 1, is mounted upon rollers Q, and upon the face of one of them is secured a pinion, T, meshing with the worm V, which is secured upon a hollow shaft, W, having upon its outer end a barker's mill, X, the inner end of the hollow shaft being secured in a packing-box, Y, applied upon the lower end of the waste-outlet pipe $a$. The pipe or hollow shaft W may be rotated, owing to the box Y, without disarranging the pipe $a$. The pipe $a$ is supplied with a valve, $b$, and is connected with the supply-port in the disk K.

The means just described for rotating the filter is illustrated in Fig. 3 for convenience of illustration; but it may be understood in the following description of its operation as being connected by a pipe, $a$, with the disk K in Fig. 1.

When it is desired to rotate the filter by means of the barker's mill, I open the valve in the pipe $a$, close the valve $f$ in the supply-pipe O, and direct the water into the cylinders C through the pipes P and H. The water will then escape through the pipes G and passage L into the outlet-pipe $a$, and thence through [the pipe W and barker's mill X, which will rotate during the flow of the water according to well-known principles, and in doing so will rotate the worm-shaft W, pinion T, and roller Q, whereby the heads A B and cylinders C will be caused to gradually revolve, reversing the position of the filter-beds. After the granular filtering material has become clean the valves will be realtered to their former positions, and the operation of filtering proceeded with as before.

What I claim as my invention, and desire to secure by Letters Patent, is—

1. In a filter, a rotating series of receptacles having independent inlet and outlet ports and containing beds of filtering material partly filling them, combined with independent pipes leading from each of said inlets to a common supply, and pipes leading from each of said outlets to a common delivery, substantially as set forth.

2. In a filter, a series of receptacles having inlet and outlet ports and containing beds of filtering material partly filling them, combined with a series of pipes leading from said inlets to a common supply, a series of pipes leading from said outlets to a common delivery, and stationary supply and delivery ports, the filter being capable of rotation for the purpose of loosening the filter-beds and reversing the passage of the water through them, substantially as set forth.

3. In a filter, a series of receptacles having inlet and outlet ports and containing beds of filtering material partly filling them, combined with a series of pipes leading from said inlets to a common supply, a series of outlets leading to a common delivery, stationary supply and delivery ports, and a waste-pipe for water used in washing the beds of filtering material, the filter being capable of rotation for the purpose of loosening the filtering agent and of reversing the passage of the water through the same, substantially as set forth.

4. In a rotating filter, a series of receptacles having inlet and outlet ports and containing beds of filtering material, in combination with a series of pipes leading from said inlets to a common supply, a series of pipes leading from said outlets to a common delivery, stationary supply and delivery ports, a waste-pipe, a barker's mill in communication with said waste-pipe, and pinion and rollers supporting the filter, substantially as set forth.

5. In a rotating filter, a series of receptacles having inlet and outlet ports and containing beds of filtering material, combined with a series of pipes leading from said inlets to a common supply-port, a series of pipes leading from said outlets to a common delivery-port, a waste-pipe, a barker's mill communicating with said waste-pipe, and gearing connecting the mill and the filter, substantially as set forth.

6. In a filter, a rotating series of receptacles having inlet and outlet ports and containing beds of filtering material partly filling them, combined with pipes leading from a common supply to said inlets, pipes leading from said outlet to a common delivery, waste-pipe, and a water-motor adapted to be actuated by the flow of the water to rotate the filter, substantially as set forth.

7. A reversible filter consisting of a receptacle containing a loosely-placed bed of filtering material which partially fills the receptacle and having a supply and delivery, combined with a water-motor, whereby the flow of water may be utilized to rotate the receptacle, substantially as and for the purposes set forth.

8. A reversible filter consisting of a receptacle containing a loosely-placed bed of filtering material which partially fills the receptacle, protected supply and delivery ports, a waste-outlet, and a water-motor in communication with said waste-outlet and adapted to rotate the filter when desired, substantially as and for the purposes set forth.

Signed at New York, in the county of New York and State of New York, this 22d day of May, A. D. 1885.

JOHN W. HYATT.

Witnesses:
GEORGE COOK,
ARTHUR L. HENTHORN.